No. 791,258. PATENTED MAY 30, 1905.
J. E. FORD.
NUT LOCK.
APPLICATION FILED JUNE 7, 1904.
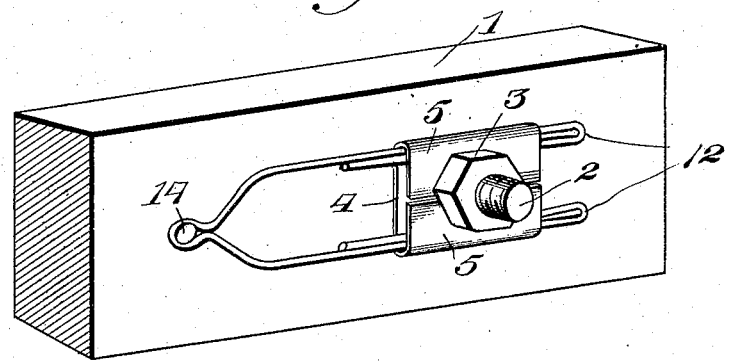
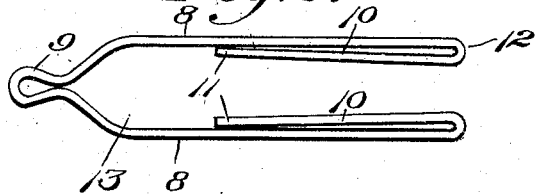
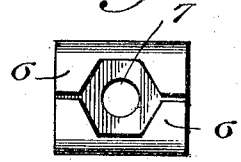
Inventor
John E. Ford.
Witnesses
Phil. E. Barnes.
Eli Blakistone
By Victor J. Evans
Attorney No. 791,258.  
Patented May 30, 1905.

UNITED STATES PATENT OFFICE.

JOHN E. FORD, OF BELT, MONTANA.

NUT-LOCK.

SPECIFICATION forming part of Letters Patent No. 791,258, dated May 30, 1905.

Application filed June 7, 1904. Serial No. 211,509.

*To all whom it may concern:*

Be it known that I, JOHN E. FORD, a citizen of the United States, residing at Belt, in the county of Cascade and State of Montana, have invented new and useful Improvements in Nut-Locks, of which the following is a specification.

This invention relates to nut-locks, the object of the present invention being to provide a simple, cheap, and reliable nut-lock especially adapted for use upon rail-joints, agricultural implements, &c., but also adapted for use at any point where it is desirable or necessary to lock a nut and prevent the same from working loose.

The nut-lock hereinafter described is adapted for use either in connection with a single nut or with a plurality of nuts by merely changing the dimensions of the nut-lock as a whole.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a perspective view of a nut-lock complete embodying the present invention and shown applied to a bolt and nut. Fig. 2 is a plan view of the lock *per se*. Fig. 3 is a plan view of a folded combined washer and lock-retainer.

Referring to the drawings, 1 designates an object, such as a block, to which is shown applied a bolt 2 and nut 3. In order to lock the nut 3 and prevent the same from working loose on the bolt 2, I employ a combined washer and lock-retainer, which is shown in Figs. 1 and 3 as comprising a flat base portion 4 and oppositely-arranged parallel flanges 5, the said washer and retainer being preferably composed of a single sheet-metal blank the central portion of which is left flat to form the bottom or base 4, while the flanges 5 are formed by bending the edge portions of the blank over and inward, as best shown in Fig. 1, to form guides for the sliding movement of the arms of the lock proper, hereinafter described, said arms working between the base 4 and the flanges 5 in the manner indicated in Fig. 1. If desired, the flanges 5 may be continued to form lips 6, which preferably conform to the sides of the nut, as indicated in Figs. 1 and 3, so as to interlock with the nut, while the base 4 is provided with a central opening 7, through which the bolt 2 passes.

In connection with the combined washer and lock-retainer hereinbefore described I employ a lock which is illustrated in detail in Fig. 2 and which comprises substantially parallel arms 8, connected at one end by an eye 9, the said arms having their free ends recurved or bent back, as shown, and extended along the inner sides of the arms proper to form spring-jaws 10. While the extremities 11 of the jaws 10 lie in contact with or in close proximity to the arms 8, the bends 12 thereof are left open in order to impart the necessary resiliency or spring action to the jaws 10. The extremities 11 of the spring-arms also terminate at a sufficient distance from the eye 9 to leave an enlarged space or opening at the point 13, which will admit of the nut being turned within the lock preparatory to moving the spring-arms 10 into engagement with the nut.

In operation the combined washer and lock-retainer is placed upon the bolt against the object 1, and the nut is then turned up against the washer, it being understood that the lock has been moved lengthwise until the spring-jaw terminals 11 are beyond the nut or until said terminals are out of contact with the nut. The lock is then drawn lengthwise until the spring-jaws 10 engage the opposite flat sides or surfaces of the nut in the manner indicated in Fig. 1. The bent-over flanges 5 prevent the spreading apart of the arms 8, and the spring-jaws 10 are thus held in firm engagement with the opposite portions of the nut, the latter being thereby prevented from turning on the bolt. The pin or other suitable fastener 14 may be inserted through the eye 9 of the lock into the object 1 in order to prevent the lock from sliding out of engagement with the nut. The lock is adapted to be used either with or without the lips 6. Where such lips are employed, they serve to lock the combined washer and lock-retainer to the nut, so that one cannot turn without the other.

Having thus described the invention, what is claimed as new is—

1. A nut-lock comprising a combined washer and lock-retainer, and a sliding lock associated with said washer and provided with arms which engage the washer, spring-jaws adapted to be moved into and out of engagement with the opposite portion of the nut, and means for holding the lock against rotation.

2. A nut-lock comprising a washer having bent-over flanges at opposite sides, and a lock having oppositely-arranged arms which are engaged by the flanges, spring-jaws adapted to be moved into and out of engagement with opposite portions of the nut, and means for holding the lock against rotation.

3. A nut-lock comprising a washer having opposite portions thereof bent to form retainer-flanges, a lock having oppositely-arranged arms slidingly engaged with said flanges and bent back to form spring-jaws movable into and out of engagement with opposite portions of the nut, and means for holding the lock against rotation.

4. A nut-lock comprising a washer having opposite portions thereof bent over to form retainer-flanges, a lock embodying oppositely-arranged arms slidingly retained by said flanges and having their end portions bent back upon themselves to form inclined spring-jaws movable into and out of engagement with opposite portions of the nut, and means for holding the lock against rotation.

5. A nut-lock comprising a washer having opposite portions thereof bent over to form retainer-flanges, and a lock comprising oppositely-arranged arms bent back to form nut-engaging jaws, said lock being provided with an eye to receive a suitable fastener, substantially as and for the purpose set forth.

6. A nut-lock comprising a combined washer and lock-retainer, said retainer having portions to engage the nut, a lock slidingly connected with said washer, means carried by the lock to be moved into or out of engagement with opposite sides of the nut and washer, and means for holding the lock against rotation.

7. A nut-lock comprising a combined washer and lock-retainer, said retainer having portions to engage the nut, a lock slidingly connected with the washer, spring means carried by the lock to engage opposite sides of the nut and washer, and means for holding the lock against rotation.

In testimony whereof I affix my signature in presence of two witnesses.

JOHN E. FORD.

Witnesses:
  JOSEPH J. BURNS,
  H. L. DES COMBES.